Figure 1:
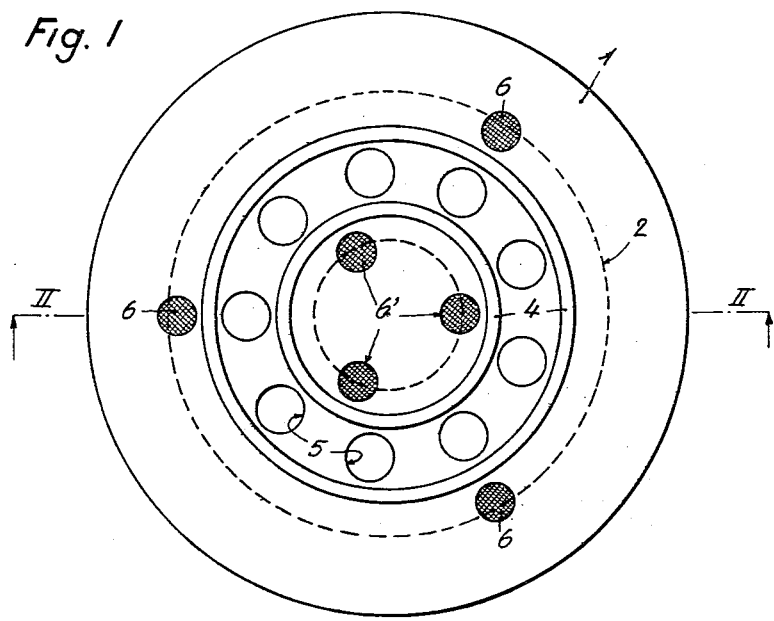

Dec. 18, 1956     R. BERNAT ET AL     2,774,375

AUTOMATIC SHUT-OFF VALVES

Filed April 22, 1953

INVENTORS:
RAOUL BERNAT
HENRI BERNAT

United States Patent Office 2,774,375
Patented Dec. 18, 1956

2,774,375
AUTOMATIC SHUT-OFF VALVES

Raoul Bernat and Henri Bernat, Bordeaux, France; said Henri Bernat, sole heir of said Raoul Bernat, deceased Application April 22, 1953, Serial No. 350,448
In France February 19, 1946

Section 1, Public Law 690, August 8, 1946
Patent expires February 19, 1966

3 Claims. (Cl. 137—516.19)

This invention relates to automatically actuated valves, and more particularly to those of the type employed in gas or air compressors, and which are usually returned to their seats by springs. With some types of valves of this nature, the valve is in the form of a thin plate having a thickness ranging from $20/100$ to $30/100$ of a millimeter or more, and a thin disc having a thickness ranging from $10/100$ to $15/100$ of a millimeter, is pleated or corrugated, and serves as a spring to effect the return of the valve to its seat. In other cases a return of the valve to its seat is assured by attaining a back flow of a relatively small amount of the compressed air or gas.

These valve structures are found in practice to be not altogether satisfactory, and in particular when employed in high-speed compressors. Helical return springs for valves are subjected to breakage. Stamped-out valve discs are often weakened by the punching operation and have been known to break at weak spots. With extra thin valves using a corrugated disc spring, such springs often break in the corrugated sections. Valves returned to a seat by compressed air often result in escape and retrogression of the gas or air.

The present application is a continuation-in-part application of application Serial No. 735,316, filed March 18, 1947, now abandoned, and discloses and claims an invention which absolutely overcomes these and other difficulties and also those inherent in known electro-solenoid controlled valves, which cannot properly function under the influence of moisture, atmospheric disturbances and necessitate special-timed switching means.

With these known objections clearly apparent, it is one of the objects of the present invention to provide an automatic valve in which such objections are corrected and a greatly improved structure results. Primarily, the invention consists in means by which the valve or valves are returned to its seat by magnetic attraction. Such magnetic attraction can be obtained by making at least a part of the valve, and especially the seat thereof, of a permanently magnetized metal, and making the valve proper of a magnetically-attracted metal, but one not necessarily possessing permanent magnetization. It is also possible to make the seat of the valve of a non-magnetic metal, such as aluminum, bronze or the like, and insert masses, pegs or other inserted elements of permanently magnetized metal, in such seat at positions uniformly distributed in relation to the surface of the valve to be attracted thereby. The magnetic metal selected will preferably be a metal of high magnetic attraction, such as that marketed under the trade name of "Ticonal," "Alnico" and possibly under other names. The valve proper may consist of an annular metallic washer or ring adapted to cover a series of orifices arranged in a circle in the valve body, and the masses of inserted magnetic metal may also be evenly distributed in the valve seat, and possibly in circular arrangement, in such a way that the magnetic attraction exerted thereby will be evenly distributed all around the valve. The magnetic inserts may also be arranged in pairs or otherwise arranged in a manner to obtain an appropriate distribution of the north and south poles facing the valve.

It is another object of the invention to provide a valve of the type described with shock-absorbing means by which the shock of impingement of the valve against a stop or abutment will be materially decreased, such means consisting of one or more undulated, springy discs interposed between the valve and its stop.

These and other objects are attained by the invention, a more particular description of which will hereinafter appear and be pointed out in detail in the claims appended hereto.

Figure 2:
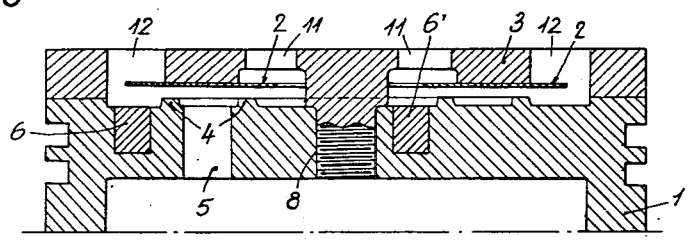
Figure 3:
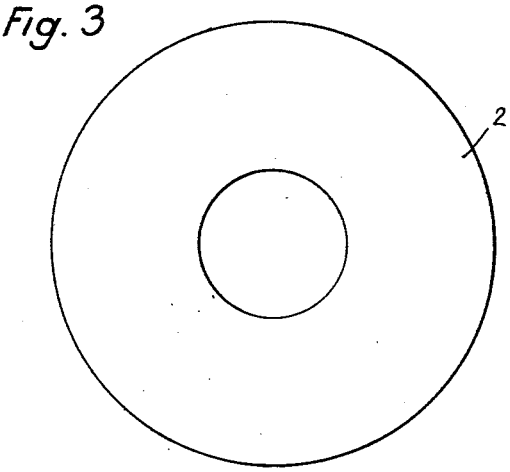

In the accompanying drawings, wherein several embodiments of the invention are disclosed, Fig. 1 is a plan view of a piston in which is incorporated a modified form of valve;

Fig. 2 is a sectional view, taken substantially on the line II—II of Fig. 1, looking in the direction of the arrows; and Fig. 3 is a plan view of the valve as employed in the structure shown in Figs. 1 and 2.

In the embodiment of the invention shown in Figs. 1, 2 and 3 is shown a piston, such as might be employed in an air or gas compressor or other apparatus, which is reciprocated in a cylinder in the known manner. The piston is provided with a washer-like metallic valve 2 of annular form, which is adapted to be magnetically drawn to a seated position on its seat consisting of a pair of concentrically-arranged raised ribs 4 between which are located the orifices 5. The valve stop or abutment is indicated at 3 and the same is threaded, as indicated at 8, into the top of the piston 1. The stop member 3 may be formed with the outlet openings 11 and 12. In Fig. 2 the valve is shown in its open position. When the valve is in this position, it will permit the passage of air or gas through the orifices 5 and through the openings 11 and 12 provided in the valve step or abutment 3, whereas when the valve 2 is in its closed position, it will cover and close the orifices 5 and hence no gas or air can pass upwardly through the orifices 5 to the openings 11 and 12.

The valve device includes a plurality of magnetic inserts or pegs 6 and 6', the pegs indicated at 6 being located on the outside of the seating ribs 4, and the pegs shown at 6' being located within the space defined by the innermost rib 4, as clearly seen in Fig. 1. These magnetic pegs or inserts 6 and 6' are so located that the magnetic attraction exerted by the same is distributed evenly over the under face of the valve 2, so that the resultant force exerted on the valve will be correctly directed axially. The valve 2 is of such a size that it extends laterally beyond the outer seating rib 4, or in other words overhangs its seat.

From the foregoing, the operation of the valve will be readily understood. During the descent of the piston the pressure of the air or gas on the underside of the valve 2 will keep the valve in its raised or open position, as shown in Fig. 2, and thus the air or gas will pass through the orifices 5, 11 and 12. As soon as the piston reaches its lowermost position of descent the pressure on the valve will be reduced, and the magnetic attraction exerted by the pegs 6 and 6' will draw the valve 2 down to its seated or closed position, in which position it will remain during the ascending movement of the piston so that the gas then in the cylinder above the piston will be compressed. It will be observed that the openings 11 and 12 in the valve stop 3 are so located with relation to the valve 2 that as soon as upward pressure on the valve by the gas or air is reduced or stopped the valve is magnetically attracted to its seat 4, the descent of the valve to a seated position is accelerated by the pressure of the gas in the cylinder above the piston.

Having described an embodiment of the invention, it is obvious that the same is not to be restricted thereto, but is broad enough to cover all structures coming within the scope of the annexed claims.

What we claim is:

1. A valve arrangement comprising, in combination, a valve member having valve openings arranged in an annular row therein opening in a face of said valve member and having on said face valve seat means about said valve openings; a plurality of spaced permanent magnet means arranged in said valve member both within and outside of said annular row of valve openings with poles thereof located in the region of said valve seat means so as to form in the region of said valve seat means a plurality of independent points of magnetic attraction along said valve openings; a thin laminar annular magnetizable valve closure member arranged on said valve seat means attracted to the same by said spaced permanent magnet means at a plurality of points of magnetic attraction so as to be seated thereon, but movable away from said valve seat means against action of said permanent magnet means by pressure of fluid passing through said valve opening means, said annular magnetizable valve closure member at least partially overlying the permanent magnet means both within and outside of said annular row of valve openings; and stop means limiting movement of said magnetizable valve closure member away from said valve seat means.

2. A valve arrangement comprising, in combination, a valve member having valve openings arranged in an annular row therein opening in a face of said valve member and having on said face valve seat means about said valve openings; a plurality of equally spaced permanent magnet means arranged in said valve member within said annular row of valve openings with poles thereof located in the region of said valve seat means so as to form in the region of said valve seat means a plurality of equally spaced independent points of magnetic attraction within said annular row of said valve openings and a plurality of equally spaced permanent magnet means arranged in said valve member outside of said annular row of valve openings with poles thereof located in the region of said valve seat means so as to form in the region of said valve seat means a plurality of equally spaced independent points of magnetic attraction outside of said annular row of said valve openings; a thin laminar annular magnetizable valve closure member arranged on said valve seat means attracted to the same by said spaced permanent magnet means at a plurality of points of magnetic attraction so as to be seated thereon, but movable away from said valve seat means against action of said permanent magnet means by pressure of fluid passing through said valve opening means, said annular magnetizable valve closure member at least partially overlying the permanent magnet means both within and outside of said annular row of valve openings; and stop means limiting movement of said magnetizable valve closure member away from said valve seat means.

3. A valve arrangment comprising, in combination, a valve member having valve openings arranged in an annular row therein opening in a face of said valve member and having on said face valve seat means about said valve openings; a plurality of equally spaced permanent magnet means arranged in said valve member along an annular row within said annular row of valve openings with poles thereof located in the region of said valve seat means so as to form in the region of said valve seat means a plurality of equally spaced independent points of magnetic attraction along an annular row within said annular row of said valve openings and a plurality of equally spaced permanent magnet means arranged in said valve member along an annular row outside of said annular row of valve openings with poles thereof located in the region of said valve seat means so as to form in the region of said valve seat means a plurality of equally spaced independent points of magnetic attraction along an annular row outside of said annular row of said valve openings; a thin laminar annular magnetizable valve closure member arranged on said valve seat means attracted to the same by said spaced permanent magnet means at a plurality of points of magnetic attraction so as to be seated thereon, but movable away from said valve seat means against action of said permanent magnet means by pressure of fluid passing through said valve opening means, said annular magnetizable valve closure member at least partially overlying the permanent magnet means both within and outside of said annular row of valve openings; and stop means limiting movement of said magnetizable valve closure member away from said valve seat means.

References Cited in the file of this patent

UNITED STATES PATENTS

| | | |
|---|---|---|
| 1,319,787 | Moran | Oct. 28, 1919 |
| 1,677,357 | McGregor | July 17, 1928 |
| 1,859,879 | Longacoe | May 24, 1932 |
| 2,213,259 | Paget | Sept. 3, 1940 |
| 2,412,235 | Denberg | Dec. 10, 1946 |
| 2,501,755 | Bent | Mar. 28, 1950 |

FOREIGN PATENTS

| | | |
|---|---|---|
| 212,570 | Germany | of 1909 |
| 309,600 | Great Britain | of 1930 |
| 922,790 | France | of 1947 |
| 990,160 | France | of 1951 |
| 56,161 | France | of 1952 |
| | (Addition of No. 990,160) | |